United States Patent
Lin et al.

(10) Patent No.: US 11,030,465 B1
(45) Date of Patent: Jun. 8, 2021

(54) METHOD FOR ANALYZING NUMBER OF PEOPLE AND SYSTEM THEREOF

(71) Applicant: Automotive Research & Testing Center, Changhua County (TW)

(72) Inventors: Hung-Pang Lin, Changhua County (TW); Po-Hsiang Liao, Changhua County (TW); De-Ciang Ye, Changhua County (TW); Hsuan-Ta Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 59 days.

(21) Appl. No.: 16/699,720

(22) Filed: Dec. 1, 2019

(51) Int. Cl.
*G06T 7/194* (2017.01)
*G06K 9/32* (2006.01)
*G06T 7/246* (2017.01)
*G06K 9/00* (2006.01)

(52) U.S. Cl.
CPC ..... *G06K 9/00778* (2013.01); *G06K 9/00369* (2013.01); *G06K 9/3233* (2013.01); *G06T 7/194* (2017.01); *G06T 7/248* (2017.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 2014/0176612 A1* | 6/2014 | Tamura | ...... | G06T 3/40 345/660 |
| 2014/0240511 A1* | 8/2014 | Nystrom | ...... | H04N 5/23212 348/164 |
| 2015/0086077 A1* | 3/2015 | Du | ...... | G06K 9/00805 382/104 |

FOREIGN PATENT DOCUMENTS

| | | |
|---|---|---|
| CN | 107944327 A | 4/2018 |
| CN | 109190507 A | 1/2019 |
| CN | 106203331 B | 5/2019 |

* cited by examiner

*Primary Examiner* — Idowu O Osifade
(74) *Attorney, Agent, or Firm* — CKC & Partners Co., LLC (57) ABSTRACT

A method for analyzing a number of people includes an image shooting step and a front-end analyzing step. In the image shooting step, a first image and a second image are obtained. In the front-end analyzing step, a foreground object analysis is operated, and a plurality of foreground objects located at a region of interest in the first image are obtained. A human body detection is operated, and at least one human body and a location thereof of the second image are obtained. An intersection analysis is operated, and the location of the human body is matched to the first image. A number of people estimation is operated to estimate the number of the people according to the first covering ratio, a number of the human body, and a second covering ratio of all the foreground objects to the region of interest.

13 Claims, 7 Drawing Sheets

Fig. 9

METHOD FOR ANALYZING NUMBER OF PEOPLE AND SYSTEM THEREOF

BACKGROUND

Technical Field

The present disclosure relates to an analyzing method and a system thereof. More particularly, the present disclosure relates to a method for analyzing a number of people and the system thereof at a single site.

Description of Related Art

Pedestrian counting is a key factor in transportation systems. Through counting the number of the people standing outside the gateway of an automated shuttle or standing at the waiting station, analyzing efficiency of a service strategy can be improved. For example, the analysis of the number of the people is helpful for the practitioners to conduct dynamic bus dispatching.

In order to count the people, a method that checking the number of the people by checking the number of the connections of a wifi system is developed. By defining the flow rate of a wireless signal from a cell phone or a portable device of a pedestrian in a specific range, the number of the people can be obtained. However, the wireless signal is non-directional, and the transmitting terminals all around will be received; as a result, the counting result cannot be focused in a specific area.

Another counting method adopting GPS is developed. By obtaining the geographic location information from GPS signals of cell phones or portable devices of pedestrians, the number of the people can be obtained. However, the error of a commercial type GPS is up to 10 m; therefore, an accurate flow rate of the people has to be constructed by the movement and the historical data, and there has disadvantages of complex calculation and large dataset.

Still another counting method adopting interrupted sensors is developed. The infrared light, supersonic and other interrupted signals can be used. The number of the people can be obtained by counting articles passing between a transmission and a reception of the system. However, the interrupted sensors have to be positioned at a specific point. Moreover, the connected articles which pass through the system together cannot be identified; as a result, the counting result is not accurate.

Hence, a counting method adopting camera is developed. Images can be obtained by image sensors, and the target objects can be identified by image processing. Then the number of the people or the flow rate of the people can be obtained. The advantages are that the articles will not be restricted and that only required area is analyzed. In addition, no unnecessary noise will be received. However, the objects may be seriously covered or interfered.

Based on the abovementioned problem, how to efficiently improve the accuracy for counting the number of the people becomes a pursuit target for practitioners.

SUMMARY

According to one aspect of the present disclosure, a method for analyzing a number of people, which is applied to analyze the number of the people within a shot zone and includes an image shooting step and a front-end analyzing step, is provided. In the image shooting step, a first image is obtained by shooting the shot zone at a top-down angle, and a second image is obtained by shooting the shot zone at a side angle. In the front-end analyzing step, a foreground object analysis is operated, and a plurality of foreground objects located at a region of interest in the first image are obtained. A human body detection is operated, and at least one human body and a location thereof of the second image are obtained. An intersection analysis is operated, and the location of the at least one human body is matched to the first image to find out at least one corresponding foreground object of the foreground objects. A number of people estimation is operated. A first covering ratio of the at least one corresponding foreground object to the region of interest in the first image is calculated, and the number of the people is estimated according to the first covering ratio, a number of the at least one human body, and a second covering ratio of all of the foreground objects to the region of interest.

According to another aspect of the present disclosure, a system for analyzing a number of people, which is applied to the abovementioned method, is provided. The system for analyzing the number of the people includes a first camera disposed above the shot zone for obtaining the first image, a second camera disposed at a side of the shot zone for obtaining the second image, and a front-end controlling unit signally connected to the first camera and the second camera to obtain the first image and the second image. The front-end controlling unit includes a foreground object and background object separating module configured for obtaining the foreground objects of the first image, a human body analyzing module configured for analyzing the at least one human body and the location thereof of the second image and for calculating the number of the human body, an intersection analyzing module configured for matching the location of the at least one human body to the first image such that the at least one corresponding foreground object is obtained, and an estimating module configured for calculating the number of the people of the shot zone.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or a mechanism or a module) is referred to as be "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as be "directly disposed on", "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
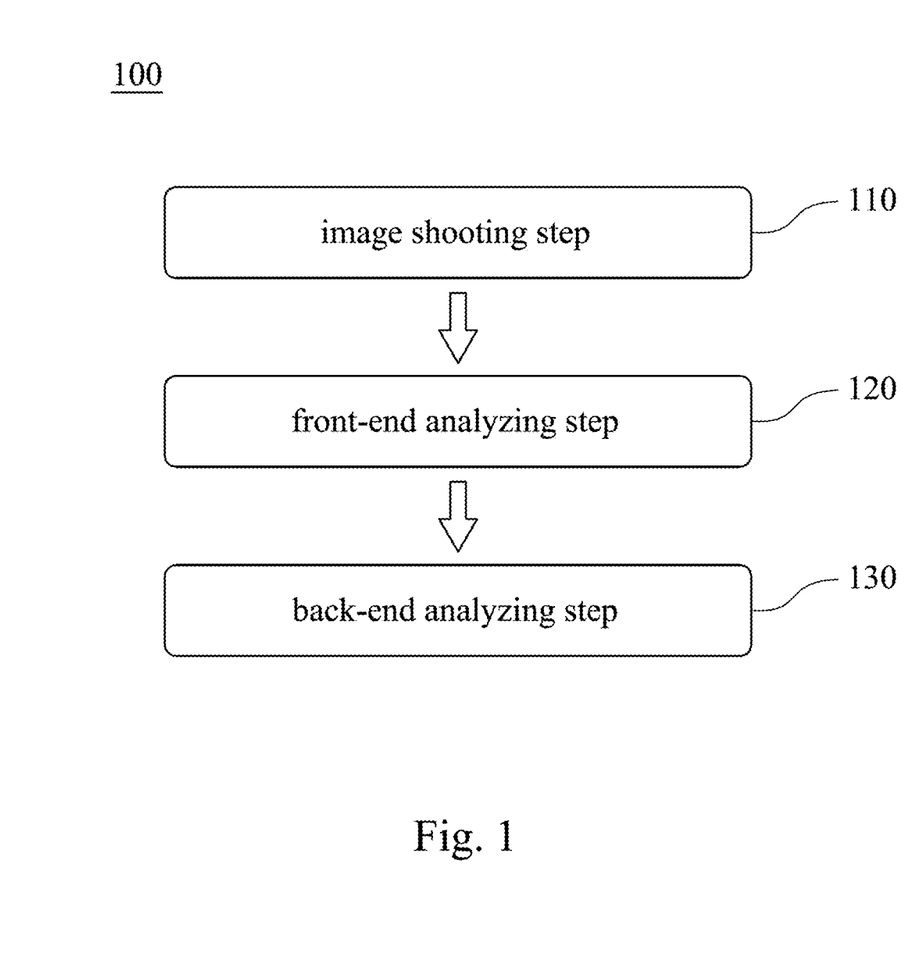
FIG. 1 is a block diagram showing a method for analyzing a number of people according to one embodiment of the present disclosure.

FIG. 1 is a block diagram showing a method 100 for analyzing a number of people according to one embodiment of the present disclosure. The method 100 for analyzing the number of the people is applied to analyze the number of the people within a shot zone and includes an image shooting step 110 and a front-end analyzing step 120.

In the image shooting step 110, a first image is obtained by shooting the shot zone at a top-down angle, and a second image is obtained by shooting the shot zone at a side angle.

In the front-end analyzing step 120, a foreground object analysis is operated, and a plurality of foreground objects located at a region of interest in the first image are obtained. A human body detection is operated, and at least one human body and a location thereof of the second image are obtained. An intersection analysis is operated, and the location of the at least one human body is matched to the first image to find out at least one corresponding foreground object of the foreground objects. A number of people estimation is operated. A first covering ratio of the at least one corresponding foreground object to the region of interest in the first image is calculated, and the number of the people is estimated according to the first covering ratio, a number of the at least one human body, and a second covering ratio of all of the foreground objects to the region of interest.

Therefore, through obtaining the first image and the second image from different angles or view angles, the intersection analysis can be conducted for the first image and the second image. As a result, the number of the people within the shot zone can be estimated. The details of the method 100 for analyzing the number of the people will be described in the following paragraphs.

Figure 2:
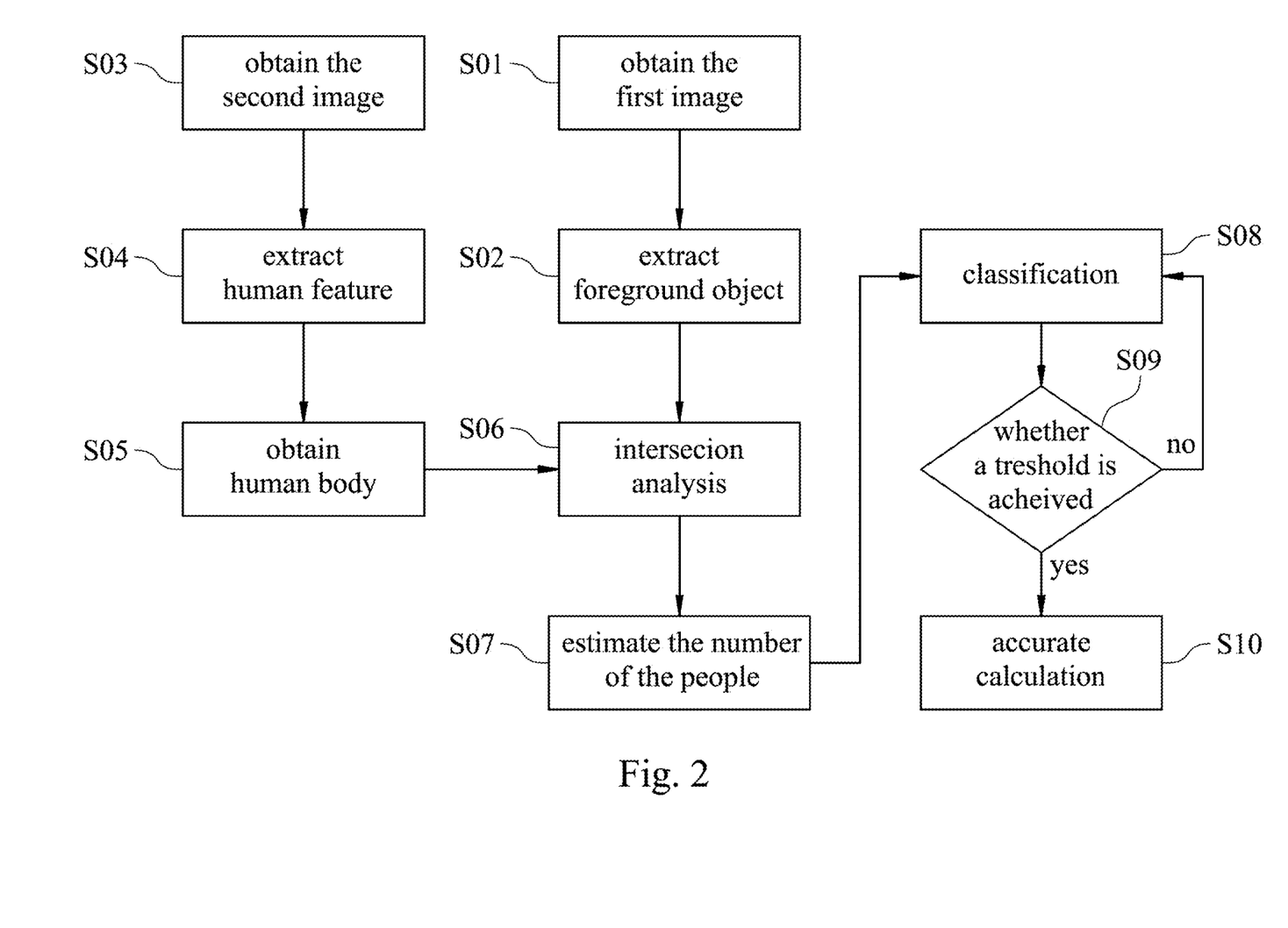
FIG. 2 is a flow chart showing the method for analyzing the number of the people of FIG. 1.
Figure 3:
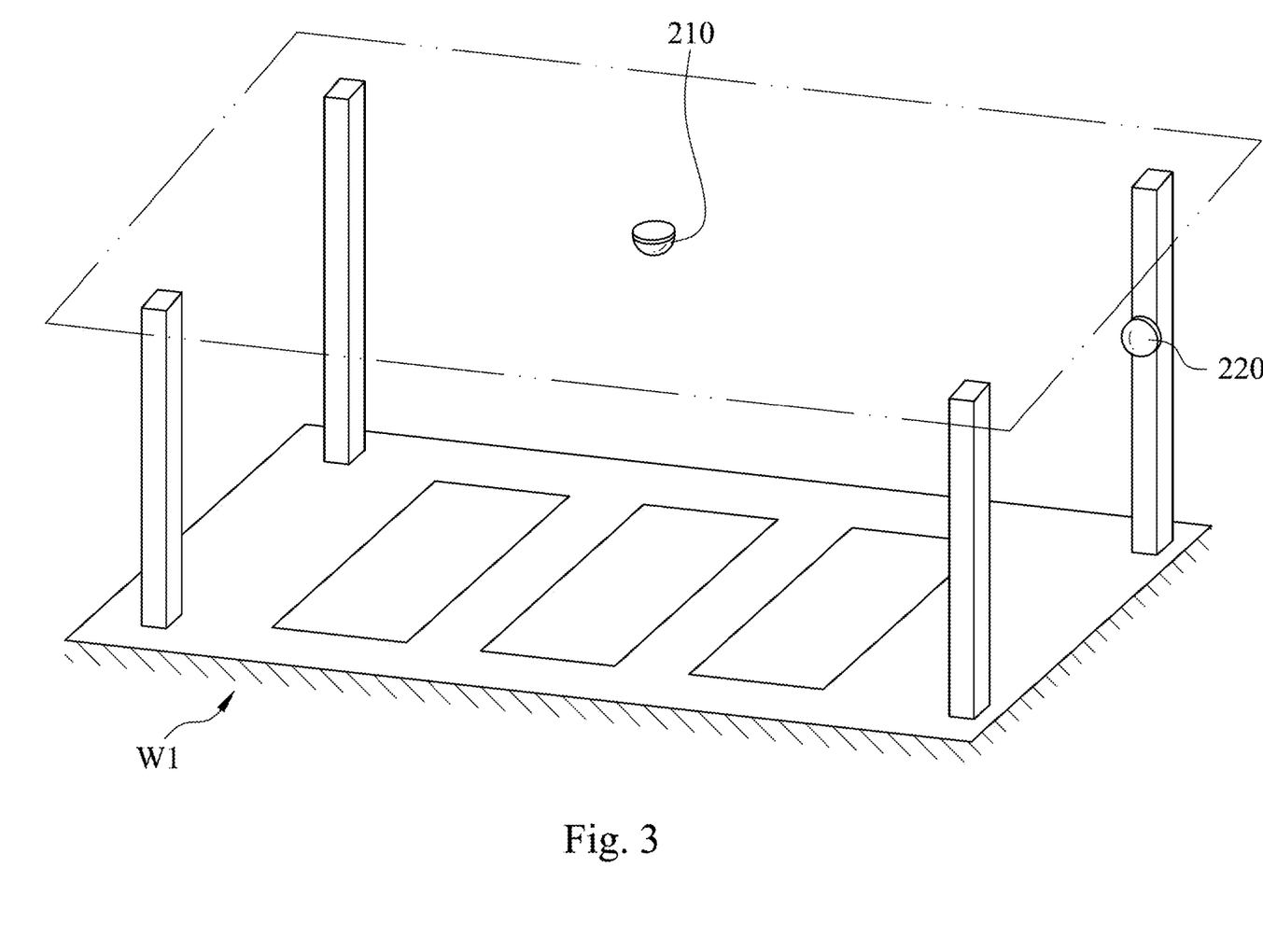
FIG. 3 is a configuration showing the method for analyzing the number of the people of FIG. 1.
Figure 4:
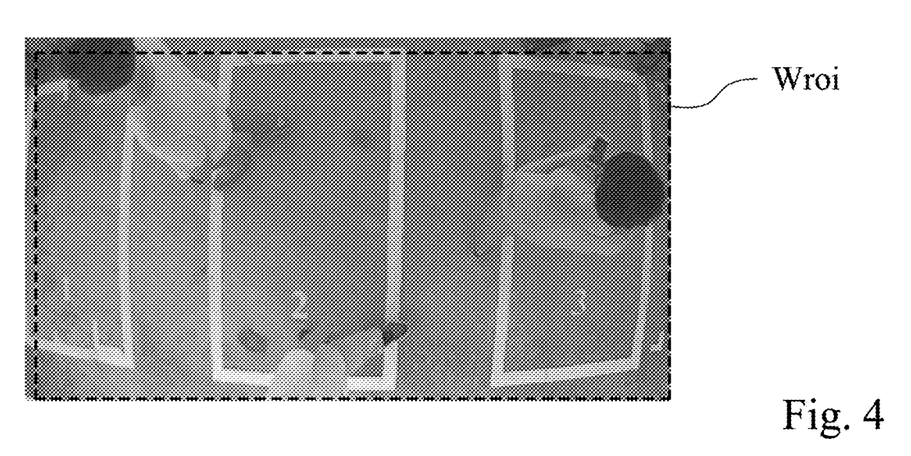
FIG. 4 shows a first image of the method for analyzing the number of the people of FIG. 1.
Figure 5:
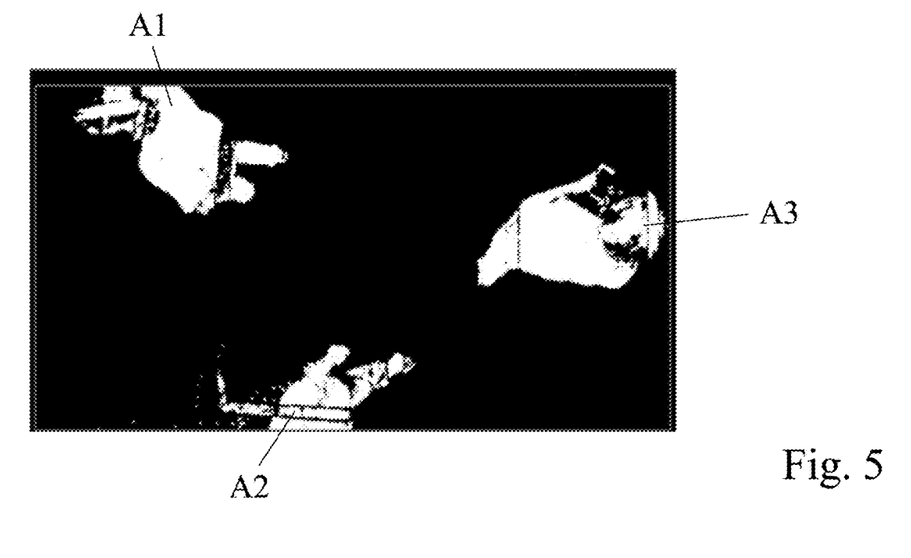
FIG. 5 shows foreground objects extracted from the first image of FIG. 1.
Figure 6:
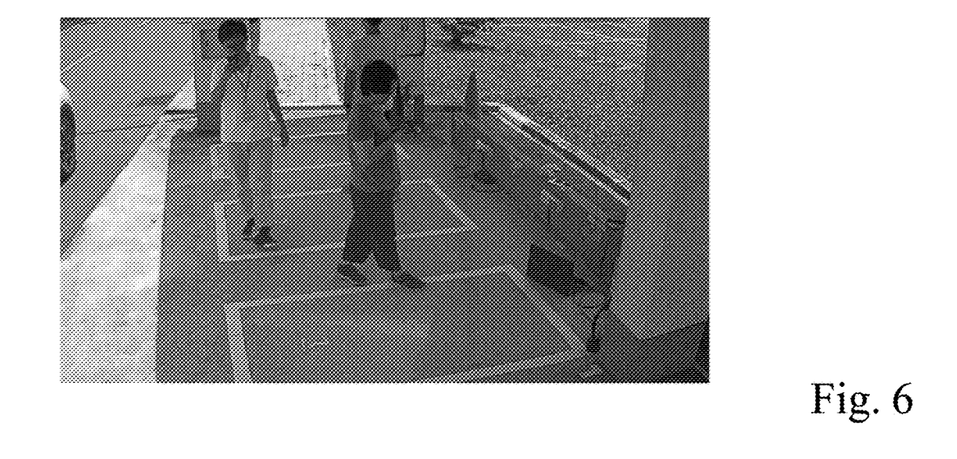
FIG. 6 shows a second image of the method for analyzing the number of the people of FIG. 1.
Figure 7:
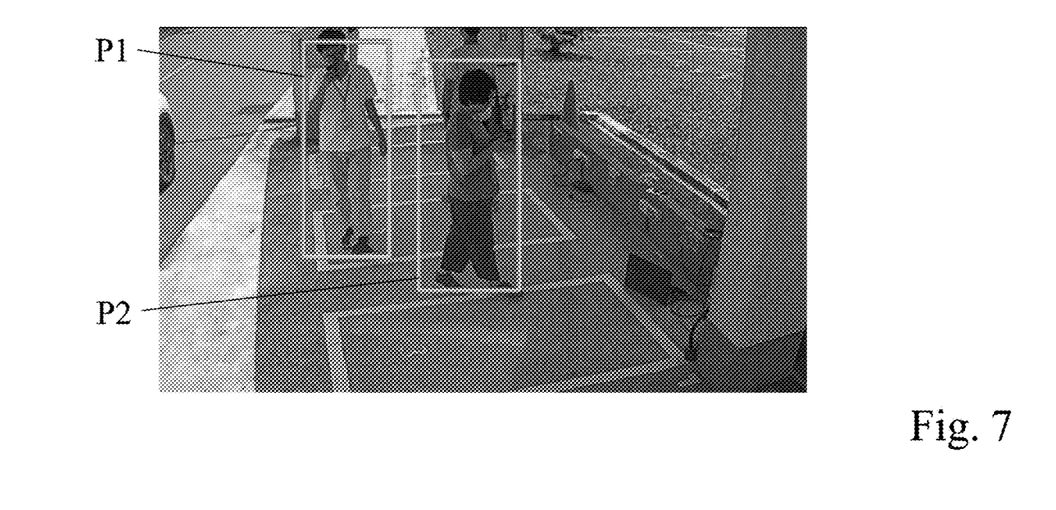
FIG. 7 shows an analyzing result of the second image of FIG. 6.
Figure 8:
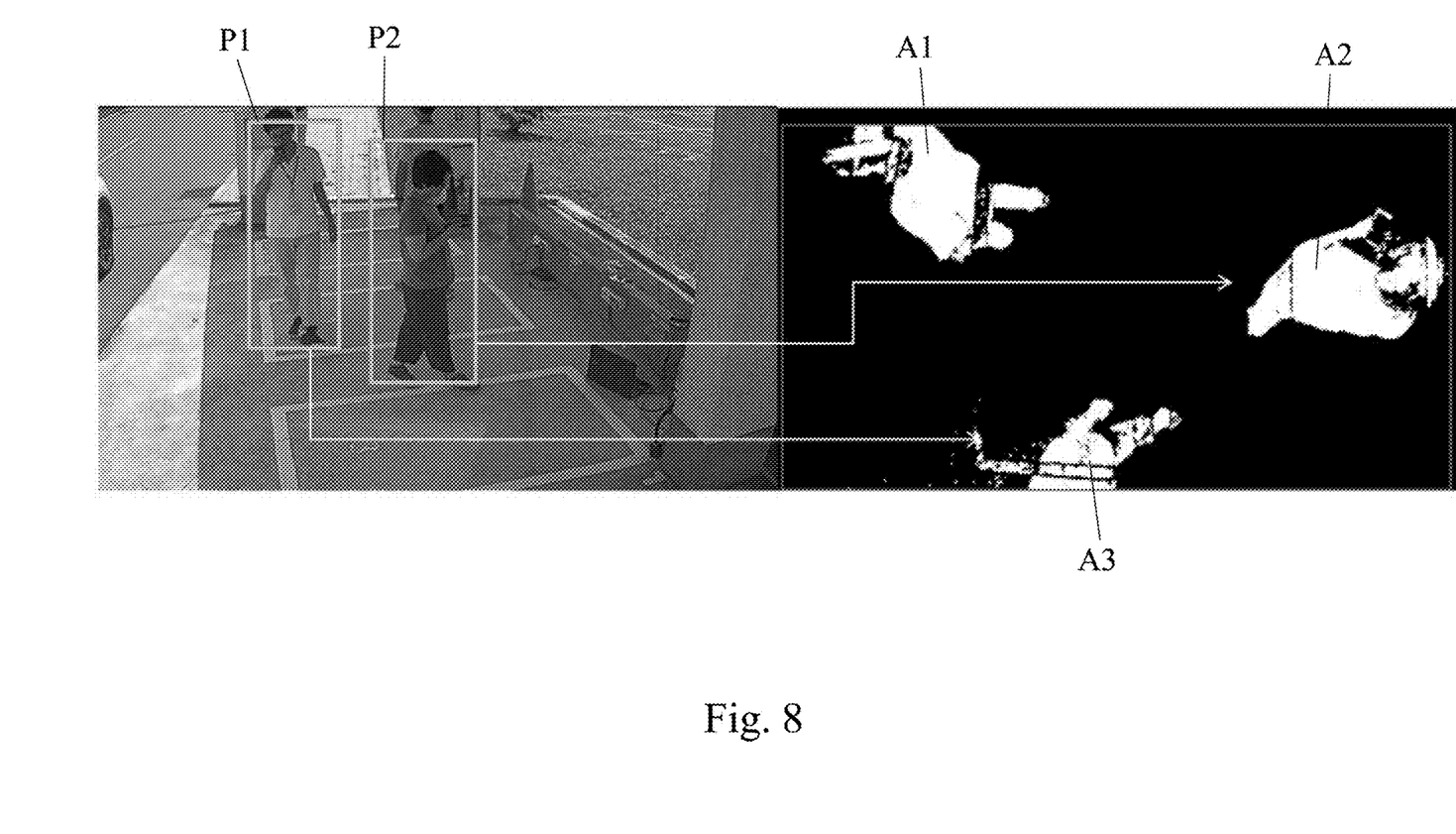
FIG. 8 shows the corresponding result of the first image and the second image.

FIG. 2 is a flow chart showing the method 100 for analyzing the number of the people of FIG. 1. FIG. 3 is a configuration showing the method 100 for analyzing the number of the people of FIG. 1. FIG. 4 shows a first image of the method 100 for analyzing the number of the people of FIG. 1. FIG. 5 shows foreground objects A1, A2 and A3 extracted from the first image of FIG. 1. FIG. 6 shows a second image of the method 100 for analyzing the number of the people of FIG. 1. FIG. 7 shows an analyzing result of the second image of FIG. 6. FIG. 8 shows the corresponding result of the first image and the second image.

A shown in FIG. 3, a first camera 210 is provided and can be disposed at a top of the shot zone W1 to shoot the shot zone W1 at a top-down angle. A second camera 220 is provided and can be disposed at a side of the shot zone W1 to shoot the shot zone W1 at a side angle. In the embodiment of FIG. 2, the shot zone W1 is illustrated as a bus station, but in other embodiments, the shot zone can be a single site, e.g., a passenger station, where counting a number of people is required. Moreover, the second camera can be disposed at any side of the shot zone. Furthermore, a single camera which is movable to shoot at any angle can be used to obtain the first image and the second image with required angle, but the present disclosure is not limited thereto.

The first image shot by the first camera 210 is illustrated in FIG. 4. A region of interest Wroi can be defined in the first image, and a foreground-background separation technique can be employed. Subsequently, the foreground objects A1, A2 and A3 shown in FIG. 5 can be extracted. In the embodiment, a constant interval time period is set between every two shots to obtain a plurality of the first images. The first images can be compared to each other, and an object which keeps still is defined as a background such that the foreground objects can be extracted.

The second image shot by the second camera 220 can be illustrated in FIG. 6. An image classifier can be employed to judge the second image. Subsequently, through feature extraction, human bodies P1 and P2 can be chosen as shown in FIG. 7. After choosing the human bodies P1 and P2, the locations of the human bodies P1 and P2 can be analyzed. For example, a specific point in the second image can be defined as an origin, and a coordinate based on the origin can be defined. Subsequently, the location of the human bodies P1 and P2 can be matched to the first image.

Real coordinates of points within the region of interest Wroi of the first image is known. Each of the locations of the human bodies P1 and P2 is converted to a human body corresponding coordinate which corresponds to one of the real coordinates of the region of interest Wroi by a 2D coordinate to 3D coordinate conversion. Precisely, the first camera 210 is configured in advance that the relationship between an arbitrary point of the first image and a real point of the shot zone W1 is known. The locations of the human bodies P1 and P2 of the second image can be converted to the real coordinates by substituting an installation height of the second camera 220, and then can be matched to the first image. Thus, the corresponding foreground objects A2 and A3 corresponding to the human bodies P1 and P2, respectively, can be obtained as shown in FIG. 8.

In the present disclosure, a covering ratio is calculated in that: a number of the pixels of the foreground objects to the total pixels within a defined region. Hence, the first covering ratio is defined as the pixels of the foreground objects A2 and A3 to the total pixels within the region of interest Wroi, and the second covering ratio is defined as the pixels of the foreground objects A1, A2 and A3 to the total pixels within the region of interest Wroi. In other words, the second covering ratio is defined as the pixels of whole foreground objects to the total pixels within the region of interest Wroi.

The abovementioned calculation can be executed by a front-end controlling unit which will be described in FIG. 9. After obtaining the first covering ratio and the second covering ratio, $n/N=t/T$ can be further calculated, wherein n represents a number of the human bodies P1 and P2, N represents the number of the people, t represents the first covering ratio, and T represents the second covering ratio. Therefore, the number of the people within the region of interest Wroi can be estimated according the number of the human bodies P1 and P2, the first covering ratio and the second covering ratio.

In other embodiments, $n(w_1)/N=t(w_2)/T$ can be further calculated by the front-end controlling unit, wherein $w_1$ represents a first weight of the first image, and $w_2$ represents a second weight of the second image. $w_1$ and $w_2$ are larger than 0 and smaller than 1, and $w_1+w_2=1$ is satisfied. In this situation, the front-end controlling unit can compare the reliabilities between the first image and the second image, and if the reliability of the first image is higher than the reliability of the second image, $w_2>w_1$ is set. In the contrary, if the reliability of the second image is higher than the reliability of the first image, $w_1>w_2$ is set.

After operating the image shooting step 110 and the front-end analyzing step 120, the number of the people within the shot zone W1 can be roughly obtained. A user can decide whether to dispatch vehicles according to the number of the people or not. In one embodiment, the number of the human can be classified into low, middle or high levels, and the vehicles can be dispatched according to the levels.

When there are too many people in the shot zone W1, the human bodies will be covered by one another, and the human body analysis of the second image will not be accurate. Hence, in order to calculate accurately, the method 100 for analyzing the number of the people can further include a back-end analyzing step 130. When the number of the people is greater than or equal to a threshold, a back-end controlling unit is provided to analyze the second image by a deep learning method such that an actuarial number of the people is obtained. If the number of the people is classified, the back-end analyzing step 130 can be executed when the number of the people achieves the high level.

The deep learning method can be a semantic segmentation. Through the training method adopting strong deep learning, fragmented or covered human body can be used as a sample for training such that an incomplete human body can be recognized. Therefore, the actuarial number of the people can be obtained.

Furthermore, in the back-end analyzing step 130, a posture of the at least one human body of the second image is judged. In the situation, the back-end controlling unit can use other kinds of deep learning methods to judge special events, such as judging a lying posture as an abnormal event, so as to send an alarm message, but the present disclosure will not be limited thereto.

As shown in FIG. 2, when operating the method 100 for analyzing the number of the people, Step S01 can be executed to obtain the first image via the first camera 210. Subsequently, Step S02 can be executed to analyze the first image such that the foreground objects A1, A2 and A3 can be extracted. Meanwhile, Step S03 can be executed to obtain the second image via the second camera 220, and Step S04 can be executed to conduct human feature extractions. Then, Step S05 can be executed to obtain the human bodies P1 and P2 and the locations thereof.

Subsequently, Step S06 can be executed to conduct the intersection analysis. The locations of the human bodies P1 and P2 of the second image can be matched to the first image to find corresponding foreground objects A2 and A3 of the foreground objects A1, A2 and A3. Then, Step S07 can be executed to allow the front-end controlling unit to estimate the number of the people.

After obtaining the number of the people, Step S08 can be executed and a classification is executed. For example, the number of the people is classified into a low level when the number of the people is within a first range. The number of the people is classified into a middle level when the number of the people exceeds the first range but is within the second range, and the number of the people is classified into a high level when the number of the people exceeds the second range. In the embodiment, the threshold can be the maximum of the second range. Consequently, Step S09 can be executed to judge whether the number of the people achieves the threshold, and if yes, the number of the people is then classified into the high level. Finally, Step S10 can be executed to conduct an accurate calculation for crowded people such that the actuarial number of the people can be obtained.

Figure 9:
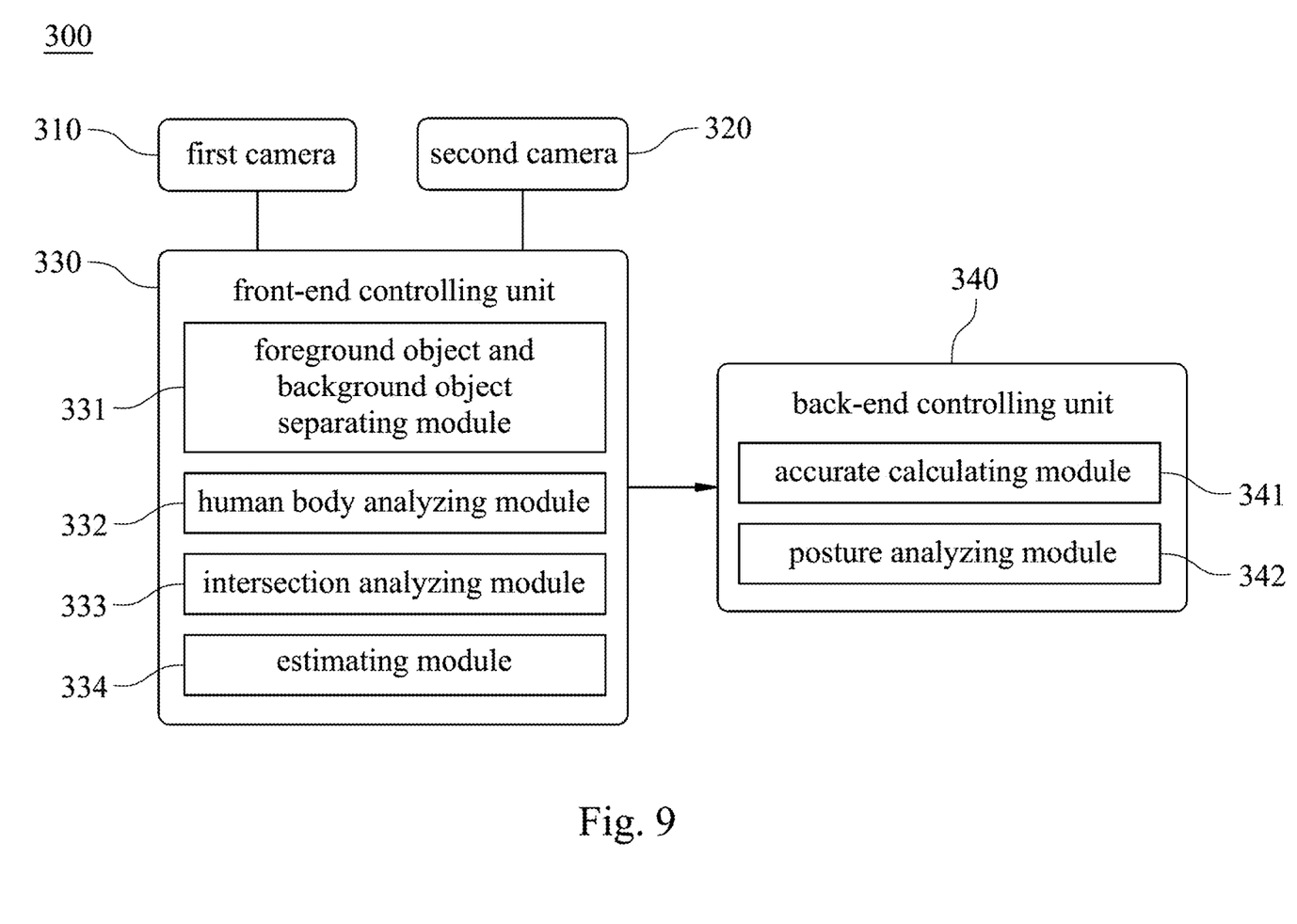
FIG. 9 is a block diagram showing a system for analyzing a number of people according to another embodiment of the present disclosure.

FIG. 9 is a block diagram showing a system 300 for analyzing a number of people according to another embodiment of the present disclosure. The system 300 for analyzing the number of the people is applied to the method 100 for analyzing the number of the people as mentioned above. The system 300 for analyzing the number of the people includes a first camera 310, a second camera 320 and a front-end controlling unit 330.

The first camera 310 is disposed above the shot zone for obtaining the first image. The second camera 320 is disposed at a side of the shot zone for obtaining the second image. The front-end controlling unit 330 is signally connected to the first camera 310 and the second camera 320 to obtain the first image and the second image. The front-end controlling unit 330 includes a foreground object and background object separating module 331 configured for obtaining the foreground objects of the first image, a human body analyzing module 332 configured for analyzing the at least one human body and the location thereof of the second image and for calculating the number of the human body, an intersection analyzing module 333 configured for matching the location of the at least one human body to the first image such that at least one corresponding foreground object of the foreground objects is obtained, and an estimating module 334 configured for calculating the number of the people of the shot zone.

The configurations of the first camera 310 and the second camera 320 can be identical to the first camera 210 and the second camera 220 shown in FIG. 3 and will not be described again.

In the foreground object and background object separating module 331, the background objects can be defined first, and then the foreground-background separation technique is used to extract the foreground objects. The human body analyzing module 332 includes an image classifier based on a support vector machine (SVM). During the training process of the SVM, a plurality of sampling images can be inputted. Then Go-histogram of gradient (GO-HOG) method can be used for HOG gradient calculation and for companion matrix calculation, which can be provide for training SVM to find a hyperplane for judging a human body or a non-human body. Therefore, in the background object separating module 331, the GO-HOG method can be employed to extract the features of the human body of the second image, and then the SVM can judge the human body according to the extracted features.

In the intersection analyzing module 333, the location of the human body can be converted by a 2D coordinate to 3D coordinate conversion such that the corresponding foreground objects of the first image can be obtained. Consequently, $n/N=t/T$ or $n(w_1)/N=t(w_2)/T$ can be calculated by the estimating module 334 to obtain the number of the people of the shot zone. The number of the people of the shot zone can be further classified into different levels.

The system 300 for analyzing the number of the people can further include a back-end controlling unit 340 signally connected to the front-end controlling unit 330 and including an accurate calculating module 341. A deep learning method is employed by the accurate calculating module 341 for analyzing the second image to obtain an actuarial number of the people. When the number of the people is larger than a threshold, a starting signal is sent by the front-end controlling unit 330 to the back-end controlling unit 340.

In other words, after the number of the people is calculated by the estimating module 334 of the front-end controlling unit 330, the starting signal will be sent as long as the number of the people achieves the high level or the threshold. Subsequently, after the background controlling unit 340 receiving the starting signal, the accurate calculating module 341 will start the analysis.

In the accurate calculating module 341, the deep learning method is a semantic segmentation. The accurate calculating module 341 employs convolutional neural networks (CNN) to analyze the second image. The features of the second image are extracted via constructing a plurality of convolutional layers, and then be processed by fully convolutional networks (FCN) for conducting the semantic segmentation. As a result, the recognizing ability of incomplete human bodies, such as the covered or fragmented human bodies, is increased, and the actuarial number of the people can be obtained.

The back-end controlling module 340 can further include a posture analyzing module 342 configured for analyzing the at least one human body of the second image to judge a posture of the at least one human body. The posture analyzing module 342 can employ other kinds of deep learning methods to judge the posture of the human body. In other embodiments, the posture analyzing module can be omitted, but the present disclosure is not limited thereto.

Based on the abovementioned embodiments, the present disclosure has the following advantages.

1. Through the configurations of the front-end controlling unit and the back-controlling module, the system for analyzing the number of the people can have the scalability of a distributed system.

2. The back end is cooperated with the front end. Since the back end is triggered by the front end to conduct an accurate calculation when a specific condition is achieved, the high loading problem caused by adopting deep learning equipment in whole system can be prevented. Moreover, the method for analyzing the number of the people can have the capability of edge computing, which allows the source to be efficiently used.

3. Images with different angles are obtained, and the intersection of the images can be compared while the region of interest is defined. Moreover, the number of the people can be estimated by the statistics method according to the locations and the number of the human bodies, the first covering ratio and the second covering ratio. Furthermore, the number of the people can be classified.

4. Since the semantic segmentation adopted by the back-end analyzing step has a good recognizing ability of incomplete human bodies, it is facilitate for counting people in an open space. The flexibility and the human detecting efficiency are high.

5. The back-end analyzing step can employ other deep learning methods to judge special events, e.g., identifying a posture, and the application of the method and system for analyzing the number of the people can be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for analyzing a number of people, which is applied to analyze the number of the people within a shot zone, comprising:
   an image shooting step, comprising:
      shooting the shot zone at a top-down angle to obtain a first image; and
      shooting the shot zone at a side angle to obtain a second image; and
   a front-end analyzing step, comprising:
      operating a foreground object analysis, wherein a plurality of foreground objects located at a region of interest in the first image are obtained;
      operating a human body detection, wherein at least one human body and a location thereof of the second image are obtained;
      operating an intersection analysis, wherein the location of the at least one human body is matched to the first image so as to find out at least one corresponding foreground object of the foreground objects; and
      operating a number of people estimation, wherein a first covering ratio of the at least one corresponding foreground object to the region of interest in the first image is calculated, and the number of the people is estimated according to the first covering ratio, a number of the at least one human body, and a second covering ratio of all of the foreground objects to the region of interest.

2. The method of claim 1, wherein, in the front-end analyzing step, a front-end controlling unit is provided to calculate $n(w_1)/N=t(w_2)/T$, wherein n represents a number of the at least one human body, N represents the number of the people, t represents the first covering ratio, T represents the second covering ratio, $w_1$ represents a first weight of the first image, $w_2$ represents a second weight of the second image, $w_1$ and $w_2$ are larger than 0 and smaller than 1, and $w_1+w_2=1$ is satisfied.

3. The method of claim 1, wherein, in the front-end analyzing step, a front-end controlling unit is provided to calculate $n/N=t/T$, wherein n represents a number of the at least one human body, N represents the number of the people, t represents the first covering ratio, and T represents the second covering ratio.

4. The method of claim 1, further comprising:
   a back-end analyzing step, wherein when the number of the people is greater than or equal to a threshold, a back-end controlling unit is provided to analyze the second image by a deep learning method such that an actuarial number of the people is obtained.

5. The method of claim 4, wherein the deep learning method is a semantic segmentation.

6. The method of claim 4, wherein, in the back-end analyzing step, a posture of the at least one human body of the second image is judged.

7. The method of claim 4, wherein, in the front-end analyzing step, real coordinates of points within the region of interest of the first image is known, the location of the at least one human body is converted to a human body corresponding coordinate which corresponds to one of the real coordinates of the region of interest by a 2D coordinate to 3D coordinate conversion.

8. The method of claim 1, wherein, in the foreground object analysis, a constant interval time period is set between every two shots to obtain a plurality of the first images, the first images are compared to each other, and an object which keeps still is defined as a background such that the foreground objects can be extracted.

9. The method of claim 1, wherein, in the front-end analyzing step, a classification is executed, the number of the people is classified into a low level when the number of the people is within a first range; the number of the people is classified into a middle level when the number of the people exceeds the first range but is within the second range; and the number of the people is classified into a high level when the number of the people exceeds the second range.

10. A system for analyzing a number of people, which is applied to the method of claim 1, comprising:
    a first camera disposed above the shot zone for obtaining the first image;
    a second camera disposed at a side of the shot zone for obtaining the second image; and
    a front-end controlling unit signally connected to the first camera and the second camera to obtain the first image and the second image, the front-end controlling unit comprising:
        a foreground object and background object separating module configured for obtaining the foreground objects of the first image;
        a human body analyzing module configured for analyzing the at least one human body and the location thereof of the second image and for calculating the number of the human body;
        an intersection analyzing module configured for matching the location of the at least one human body to the first image such that at least one corresponding foreground object of the foreground objects is obtained; and
        an estimating module configured for calculating the number of the people of the shot zone.

11. The system of claim 10, further comprising:
    a back-end controlling unit signally connected to the front-end controlling unit and comprising an accurate calculating module, wherein a deep learning method is employed by the accurate calculating module for analyzing the second image to obtain an actuarial number of the people;
    wherein when the number of the people is larger than a threshold, a starting signal is sent by the front-end controlling unit to the back-end controlling unit.

12. The system of claim 11, wherein the deep learning method is a semantic segmentation.

13. The system of claim 11, wherein the back-end controlling module further comprises:
    a posture analyzing module configured for analyzing the at least one human body of the second image to judge a posture of the at least one human body.

* * * * *